US009581689B2

(12) United States Patent
Ando

(10) Patent No.: US 9,581,689 B2
(45) Date of Patent: Feb. 28, 2017

(54) READER/WRITER AND ARTICLE SORTING SYSTEM

(75) Inventor: Masahiko Ando, Tochigi (JP)

(73) Assignee: The Nippon Signal Co., Ltd., Tokyo (JP)

( * ) Notice: Subject to any disclaimer, the term of this patent is extended or adjusted under 35 U.S.C. 154(b) by 1158 days.

(21) Appl. No.: 12/665,899

(22) PCT Filed: Jun. 25, 2008

(86) PCT No.: PCT/JP2008/061574
§ 371 (c)(1),
(2), (4) Date: Dec. 21, 2009

(87) PCT Pub. No.: WO2009/001870
PCT Pub. Date: Dec. 31, 2008

(65) Prior Publication Data
US 2010/0182133 A1 Jul. 22, 2010

(30) Foreign Application Priority Data

Jun. 28, 2007  (JP) .............................. 2007-171229
Jun. 4, 2008   (JP) .............................. 2008-146568

(51) Int. Cl.
*H04Q 5/22* (2006.01)
*G01S 13/62* (2006.01)
(Continued)

(52) U.S. Cl.
CPC ............ *G01S 13/62* (2013.01); *G01S 13/588* (2013.01); *G06K 7/0008* (2013.01);
(Continued)

(58) Field of Classification Search
USPC ........................ 235/375–385; 340/10.1–10.6, 340/572.1–572.9
See application file for complete search history.

(56) References Cited

U.S. PATENT DOCUMENTS 2,910,683 A * 10/1959 Todd .......................... 340/870.1
2,921,301 A *  1/1960 Cartwright ..................... 342/58
(Continued)

FOREIGN PATENT DOCUMENTS

JP    8-248127 A   9/1996
JP    9-230037 A   9/1997
(Continued)

OTHER PUBLICATIONS

Patent Abstracts of Japan, Publication No. 08-248127, dated Sep. 27, 1996, 1 page.
(Continued)

*Primary Examiner* — Travis Hunnings
(74) *Attorney, Agent, or Firm* — Osha Liang LLP

(57) ABSTRACT

A system that reads and writes information from and onto a non-contact information recording medium using an electric wave includes a reader/writer and a measuring unit. The reader/writer includes an antenna configured to transmit an electric wave onto the non-contact information recording medium, a demodulator configured to demodulate a reflected wave obtained by the non-contact information recording medium modulating a part of the electric wave, and a calculator configured to obtain a delay time of the reflected wave. The measuring unit measures a difference in delay times calculated by the calculator, and obtains a change in a distance between the antenna mediating transmission/reception of the electric wave and the non-contact information recording medium.

14 Claims, 7 Drawing Sheets

(51) Int. Cl.
  *G01S 13/58* (2006.01)
  *G06K 7/00* (2006.01)
  *G06K 17/00* (2006.01)
  *G01S 13/75* (2006.01)

(52) U.S. Cl.
  CPC ........ *G06K 17/0022* (2013.01); *G01S 13/751* (2013.01); *G06K 2017/0087* (2013.01)

(56) References Cited

U.S. PATENT DOCUMENTS

| | | | |
|---|---|---|---|
| 3,223,998 A * | 12/1965 | Hose | 342/60 |
| 3,931,622 A * | 1/1976 | Freedman | 342/42 |
| 4,010,420 A * | 3/1977 | Reiner et al. | 370/324 |
| 4,058,217 A * | 11/1977 | Vaughan et al. | 209/559 |
| 4,197,501 A * | 4/1980 | Gammel et al. | 375/334 |
| 4,304,004 A * | 12/1981 | von der Neyen | 375/334 |
| 5,335,077 A * | 8/1994 | Yamashita et al. | 386/202 |
| 5,585,617 A * | 12/1996 | Ohbuchi et al. | 235/491 |
| 5,933,079 A * | 8/1999 | Frink | 340/572.4 |
| 5,952,935 A * | 9/1999 | Mejia et al. | 340/10.3 |
| 6,008,640 A * | 12/1999 | Tan et al. | 324/212 |
| 6,028,503 A | 2/2000 | Preishuberpflugl et al. | 340/10.4 |
| 6,223,990 B1 * | 5/2001 | Kamei | 235/492 |
| 6,294,960 B1 * | 9/2001 | Omori | 331/14 |
| 6,512,478 B1 * | 1/2003 | Chien | 342/357.25 |
| 6,756,880 B2 * | 6/2004 | Hartmann | 340/10.42 |
| 6,788,199 B2 * | 9/2004 | Crabtree et al. | 340/539.13 |
| 6,792,254 B1 * | 9/2004 | Constantinidis et al. | 455/232.1 |
| 6,847,256 B2 * | 1/2005 | Enguent | 329/358 |
| 6,868,073 B1 * | 3/2005 | Carrender | 370/274 |
| 6,946,950 B1 * | 9/2005 | Ueno et al. | 340/10.1 |
| 7,003,326 B2 * | 2/2006 | Hayashi et al. | 455/562.1 |
| 7,015,856 B1 * | 3/2006 | Johnson | 342/32 |
| 7,036,729 B2 * | 5/2006 | Chung | 235/385 |
| 7,072,613 B2 * | 7/2006 | Tanaka et al. | 455/63.3 |
| 7,263,389 B2 * | 8/2007 | Hayashi et al. | 455/574 |
| 7,265,675 B1 * | 9/2007 | Carrender et al. | 340/572.7 |
| 7,307,532 B2 * | 12/2007 | Ikeda et al. | 340/572.1 |
| 7,391,360 B2 * | 6/2008 | Stobbe et al. | 342/107 |
| 7,405,662 B2 * | 7/2008 | Steinke et al. | 340/572.4 |
| 7,474,609 B2 * | 1/2009 | Kawasaki | 370/203 |
| 7,554,451 B2 * | 6/2009 | Carrender et al. | 340/572.7 |
| 7,562,828 B2 * | 7/2009 | Ide | 235/492 |
| 7,580,378 B2 * | 8/2009 | Carrender et al. | 370/274 |
| 7,599,428 B2 * | 10/2009 | Kawasaki | 375/219 |
| 7,630,454 B2 * | 12/2009 | Kawasaki | 375/295 |
| 7,684,463 B2 * | 3/2010 | Kawasaki | 375/130 |
| 7,817,080 B2 * | 10/2010 | Aoyagi et al. | 342/57 |
| 7,835,338 B2 * | 11/2010 | Fujii | 370/343 |
| 7,873,096 B2 * | 1/2011 | Kawasaki | 375/146 |
| 7,961,830 B2 * | 6/2011 | Okamura et al. | 375/355 |
| 8,169,319 B2 * | 5/2012 | Kaplan et al. | 340/572.1 |
| 2001/0025887 A1 * | 10/2001 | Murayama et al. | 235/492 |
| 2003/0034887 A1 * | 2/2003 | Crabtree et al. | 340/539 |
| 2003/0227323 A1 * | 12/2003 | Enguent | 329/345 |
| 2004/0085192 A1 * | 5/2004 | Hartmann | 340/10.4 |
| 2004/0164844 A1 * | 8/2004 | Maeda et al. | 340/5.8 |
| 2005/0104956 A1 * | 5/2005 | Ono et al. | 348/61 |
| 2005/0184154 A1 * | 8/2005 | Tanaka et al. | 235/385 |
| 2005/0237953 A1 * | 10/2005 | Carrender et al. | 370/278 |
| 2005/0274791 A1 * | 12/2005 | Ikeda et al. | 235/375 |
| 2006/0077039 A1 * | 4/2006 | Ibi et al. | 340/10.1 |
| 2006/0092502 A1 * | 5/2006 | Kim et al. | 359/333 |
| 2006/0192007 A1 * | 8/2006 | Ide | 235/451 |
| 2006/0220861 A1 * | 10/2006 | Stobbe et al. | 340/572.1 |
| 2006/0284727 A1 * | 12/2006 | Steinke | 340/10.31 |
| 2006/0290472 A1 * | 12/2006 | Onderko et al. | 340/10.1 |
| 2007/0001814 A1 * | 1/2007 | Steinke et al. | 340/10.31 |
| 2007/0023520 A1 * | 2/2007 | Miyashita | 235/451 |
| 2007/0047683 A1 * | 3/2007 | Okamura et al. | 375/355 |
| 2007/0070968 A1 * | 3/2007 | Kawasaki | 370/344 |
| 2007/0109099 A1 * | 5/2007 | Raphaeli et al. | 340/10.2 |
| 2007/0189414 A1 * | 8/2007 | Kawasaki | 375/295 |
| 2007/0189415 A1 * | 8/2007 | Kawasaki | 375/295 |
| 2007/0217485 A1 * | 9/2007 | Kawasaki | 375/146 |
| 2007/0262872 A1 * | 11/2007 | Carrender et al. | 340/572.7 |
| 2008/0150699 A1 * | 6/2008 | Ohara et al. | 340/10.4 |
| 2009/0033462 A1 * | 2/2009 | Kitayoshi et al. | 340/10.1 |
| 2009/0079580 A1 * | 3/2009 | Kaplan et al. | 340/686.6 |
| 2009/0231105 A1 * | 9/2009 | Carrender et al. | 340/10.1 |
| 2009/0273465 A1 * | 11/2009 | Shamir et al. | 340/539.1 |
| 2010/0040168 A1 * | 2/2010 | Fujita et al. | 375/295 |
| 2010/0103984 A1 * | 4/2010 | Kawasaki | 375/141 |
| 2010/0109903 A1 * | 5/2010 | Carrick | 340/825.49 |

FOREIGN PATENT DOCUMENTS

| | | | | |
|---|---|---|---|---|
| JP | 2003028952 A | * | 1/2003 | ............ G01S 13/36 |
| JP | 2006-020083 A | | 1/2006 | |
| JP | 2006-284557 A | | 10/2006 | |
| WO | 03/102857 A2 | | 12/2003 | |
| WO | 2006/095828 A1 | | 9/2006 | |
| WO | WO 2006095828 A1 | * | 9/2006 | |

OTHER PUBLICATIONS

Patent Abstracts of Japan, Publication No. 09-230037, dated Sep. 5, 1997, 1 page.
Patent Abstracts of Japan, Publication No. 2006-020083, dated Jan. 19, 2006, 1 page.
International Search Report issued in PCT/JP2008/061574, mailed on Sep. 22, 2008, with translation, 7 pages.
Written Opinion issued in PCT/JP2008/061574, mailed on Sep. 22, 2008, 5 pages.
Office Action for Chinese Application No. 200880022440.X dated Nov. 30, 2011, with English translation thereof (13 pages).
Extended European Search Report for Application No. 08777590.4 dated Apr. 21, 2011 (7 pages).
English translation of the International Preliminary Report of Patentability and the Written Opinion of the International Searching Authority for International application No. PCT/JP2008/061574, mailed on Feb. 4, 2010, 8 pages.
Office Action for Japanese Application No. 2008-146568 dated May 21, 2013 (4 pages).
Patent Abstract for Japanese Publication No. 2006-284557 published Oct. 19, 2006 (1 page).

* cited by examiner (a)

| Address | Article name (24) | Target route (25) |
|---|---|---|
| AA | a | B |
| BB | b | A |
| CC | c | C |
| ⋮ | ⋮ | ⋮ |

(b)

| Address | Article name (24) | Target route (25) |
|---|---|---|
| AA | b | A |
| BB | c | C |
| CC | d | C |
| ⋮ | ⋮ | ⋮ |

Relative speed of tag

READER/WRITER AND ARTICLE SORTING SYSTEM

TECHNICAL FIELD

The present invention relates to a reader/writer and an article sorting system, and more particularly, to a reader/writer which reads and writes information from and onto a non-contact information recording medium for performing communications in a microwave system, and to an information identification technique for collectively reading information on a plurality of non-contact information recording media that are moved.

BACKGROUND ART

An RFID system using an electric wave has a long communicable distance (several tens centimeters to several meters) for a passive-type non-contact IC tag without power source. However, the communicable distance for the non-contact IC tag is not constant, because it is easily changed due to some factors, such as a direction of the antenna mounted on the non-contact IC tag, etc. Further, the communicable distance has a characteristic of a non-continuous distribution (an information readable section and non-readable section) due to an effect of reflection of an electric wave or the like. Thus, while the actual communicable area is widely expanded, its boarders cannot be clearly defined, and may remain vague.

Due to the vagueness of the communicable area, some system is required to sequentially read tags attached onto articles on a belt conveyer, so as to correctly identify the order of the tags or the movement state. In such a system, to avoid communicating with any non-target tags, many restrictions and steps are needed. For example, it is necessary to control intervals between the tags, limit the antenna output, and physically shield the electric wave (cover each article to be read, using an electric shielding curtain). This results in a difficulty on the operations.

Patent document 1 discloses an antenna for tag communication, which can cover a wide communicable area without non-communicable areas with some antennas having high directivity.

Patent document 1: JP2006-020083 A

DISCLOSURE OF THE INVENTION

However, according to a conventional technique shown in Patent document 1, an antenna for tag communication used in an RFID reader/writer has many restriction conditions. For example, the antenna should be a beam scan antenna that can scan a beam of an electric wave to be sent, the beam should have high directivity to a scanning direction, and the beam scanning should be performed in such a way that a surface including the scanning direction is to intersect the floor surface. This floor surface is a reflection surface on which the strongest reflected wave occurs. Thus, there is a problem that the antenna cannot be installed in an optimum position, depending on its place.

One or more embodiments of the present invention provide a reader/writer which obtains a change in a distance between each RDID tag and an antenna, thereby enabling to identify the arrangement order of RFID tags and the movement direction with respect to the antenna, based on a delay time of an electric wave sent by the reader/writer and an electric wave reflected from the RFID tags.

One or more embodiments of the present invention can detect that the RFID tag has passed in front of the antenna, without any delay.

One or more embodiments of the present invention can securely read the RFID tag whose direction or position is not constant.

SUMMARY OF THE INVENTION

In a system according to a first aspect of the present invention, there is provided a system which reads and writes information from and onto a non-contact information recording medium using an electric wave, the system including: a reader/writer including: an antenna configured to radiate the electric wave and receive a reflected wave modulated by the non-contact information recording medium; a transmitter configured to transmit the electric wave to the non-contact information recording medium via the antenna; a demodulator configured to demodulate the reflected wave obtained by the non-contact information recording medium modulating a part of the electric wave; a calculator configured to calculate a difference in phases between the electric wave and the reflected wave from the non-contact information recording medium; a measuring unit configured to determine that the non-contact information recording medium passes a position most closely to the antenna, on the basis of the difference in phases between the electric wave radiated from the antenna and the reflected wave from the non-contact information recording medium calculated by the calculator.

According to the first aspect of the present invention, a reader/writer performs communication with a non-contact information recording medium using a microwave in a microwave system. The electric wave (microwave) sent by the reader/writer is modulated by the non-contact information recording medium, and is received by the reader/writer as a reflected wave.

A delay time occurs between the sent electric wave and the reflected wave, in accordance with the distance. The system then obtains a change in the distance between the non-contact information recording medium and the antenna, by calculating and obtaining the delay time. As a result, it is possible to identify the arrangement order of a plurality of non-contact information recording media and the movement state in the readable area, in a system to be moved, by acquiring the change in the distance to the non-contact information recording medium to be moved.

According to a second aspect, there is provided the system, wherein the measuring unit determines, on the basis of a comparison result of the difference in phases, an arrangement order of the non-contact information recording medium moving in a same movement direction and with a same speed and moving along a same line.

For example, when the antenna is fixed and the non-contact information recording medium is moved at a constant speed, the relationship between the distance and the time is a quadratic function. That is, when focusing on one non-contact information recording medium to be moved, it approaches the antenna from a predetermined direction, and it gets away from a position nearest to the antenna. That is, it is possible to identify the movement direction and the speed, based on the direction and size of the vector of the non-contact information recording medium. As a result, it is possible to identify the arrangement order of the non-contact information recording medium and the movement direction from the antenna.

According to a third aspect, there is provided the system, wherein the measuring unit causes the calculator to calculate a change of a sign of the difference in phases between the electric wave radiated from the antenna and the reflected wave from the non-contact information recording medium when one of the non-contact information recording medium and the antenna or both of the non-contact information recording medium and the antenna move in a certain direction, thereby identifying a timing at which the non-contact information recording medium has approached most closely to the antenna.

The timing, at which the non-contact information recording medium approaches most closely to the antenna, is immediately before the direction of its vector changes. That is, the minimum point of the quadratic function lead by the relationship between the distance and the time is the time at which the non-contact information recording medium approaches most closely to the antenna. As a result, it is possible to manage the time at which the non-contact information recording medium has passed the antenna, in association with each medium.

According to a fourth aspect, there is provided the system, wherein the measuring unit determines that the non-contact information recording medium has passed in front of the antenna, at an instance at which a change occurs in the sign of the difference in phases between the electric wave radiated from the antenna and the reflected wave from the non-contact information recording medium calculated by the calculator when one of the non-contact information recording medium and the antenna or both of the non-contact information recording medium and the antenna move in a certain direction.

The relative speed far from the antenna is almost the actual speed. However, as approaching the antenna, the relative speed decrease, and will be 0 in front of the antenna. At the same time, the positive and negative of the movement direction are reversed. With this feature of the relative speed, it is possible to detect the passage of the non-contact information recording medium. However, to determine whether it has come in front of the antenna, the point of "relative speed =0" is detected. However, the relative speed may be equal to 0 even when the tag stops to be moved. This may undesirably result in error detection. According to one or more embodiments of the present invention, it is possible to securely and quickly detect that the tag is to pass in front of the antenna. In this case, the detection unit is provided with information regarding the movement of the non-contact information recording medium. In addition, the judgment is made based on conditions that the relative speed of the non-contact information recording medium and the antenna is 0, and that the non-contact information recording medium does not stop to be moved (absolute speed>0).

According to a fifth aspect, there is provided the system, wherein the reader/writer further includes: a plurality of antennas that are arranged in a plane perpendicular to a movement vector of the non-contact information recording medium, wherein the measuring unit determines that the non-contact information recording medium has passed the position most closely to the antenna by causing the calculator to calculate a change of the sign of the difference in phases between the electric wave radiated from the antenna and the reflected wave from the non-contact information recording medium.

If communication is performed while switching a plurality of antennas in time sharing, the communication opportunity per antenna decreases. This results in a problem that the passage time is measured with decreased accuracy.

When the antennas have different tendencies, it is necessary to determine which antenna is reliable. That is, different distances are provided between each of the antennas and the non-contact information recording medium. The relative speeds "v(t)" are not the same, "t" is the same, and "v(t)" has the same sign, so as to attain v(t)=0. According to one or more embodiments of the present invention, the relative speed of the non-contact information recording medium and the antenna is acquired, and the passage is identified based on the sign of "v(t)" or the point that "v(t)" is equal to 0, thereby possibly identifying the passage without considering which antenna has acquired the value.

According to a sixth aspect, there is provided the system configured to sort an article having a non-contact information recording medium that stores information about the article, the system further including: an antenna which mediates transmission/reception of an electric wave; a carrier for carrying the article; a detector for detecting passage of the article carried by the carrier; and a sorter for sorting the article carried by the carrier, and wherein the measuring unit identifies a carry order of the article by causing the calculator to calculate a change of a sign of the difference in phases between the electric wave radiated from the antenna and the reflected wave from the article when one of the article and the antenna or both of the article and the antenna move in a certain direction, and determines that a lead article has passed so as to perform sorting of the article, when the detector detects the passage of the article.

The present invention also relates to a sorting system which identifies articles to be moved and automatically sorts the articles. That is, the reader/writer of the present invention is included, and an antenna is arranged near, for example, a belt conveyer. According to one or more embodiments of the present invention, the system gives and receives information to and from the non-contact information recording medium attached onto the articles, and identifies the arrangement order of the articles and the movement direction from the antenna, based on the information. The system includes detection means and a sorter, in order to sort the articles. The detection means detects that the articles have passed, while the sorter actually sorts the articles. The control means including a PC stores the arrangement order and the movement direction. When the detection means detects that the article has passed, the control means determines that the lead article in the arrangement order has passed, and performs the sorting for the articles. As a result, even if the article in the readable area is moved, the system can correctly acquire the arrangement order, and can correctly sort the articles.

According to a seventh aspect, there is provided the system, wherein the measuring unit determines that the non-contact information recording medium has passed in front of the antenna, at an instance at which a change occurs in the sign of the difference in phases between the electric wave radiated from the antenna and the reflected wave from the non-contact information recording medium calculated by the calculator when one of the non-contact information recording medium and the antenna or both of the non-contact information recording medium and the antenna move in a certain direction.

According to an eighth aspect, there is provided the system, wherein the reader/writer further includes: a plurality of antennas that are arranged in a plane perpendicular to a movement vector of the non-contact information recording medium, wherein the measuring unit determines that the non-contact information recording medium has passed the position most closely to the antenna by causing the calculator to calculate a change of the sign of the difference in phases between the electric wave radiated from the antenna and the reflected wave from the non-contact information recording medium.

According to a ninth aspect, there is provided the system, wherein the system is configured to sort an article having a non-contact information recording medium that stores information about the article, the system further including: an antenna which mediates transmission/reception of an electric wave; a carrier for carrying the article; a detector for detecting passage of the article carried by the carrier; and a sorter for sorting the article carried by the carrier, and wherein the measuring unit identifies a carry order of the article by causing the calculator to calculate a change of a sign of the difference in phases between the electric wave radiated from the antenna and the reflected wave from the article when one of the article and the antenna or both of the article and the antenna move in a certain direction, and determines that a lead article has passed so as to perform sorting of the article, when the detector detects the passage of the article.

According to a tenth aspect, there is provided the system, wherein the measuring unit determines that the non-contact information recording medium has passed in front of the antenna, at an instance at which change occurs in the sign of the difference in phases between the electric wave radiated from the antenna and the reflected wave from the non-contact information recording medium calculated by the calculator when one of the non-contact information recording medium and the antenna or both of the non-contact information recording medium and the antenna move in a certain direction.

According to a eleventh aspect, there is provided the system, wherein the reader/writer further includes: a plurality of antennas that are arranged in a plane perpendicular to a movement vector of the non-contact information recording medium, wherein the measuring unit determines that the non-contact information recording medium has passed the position most closely to the antenna by causing the calculator to calculate a change of the sign of the difference in phases between the electric wave radiated from the antenna and the reflected wave from the non-contact information recording medium.

According to a twelfth aspect, there is provided the system, wherein the system is configured to sort an article having a non-contact information recording medium that stores information about the article, the system further including: an antenna which mediates transmission/reception of an electric wave; a carrier for carrying the article; a detector for detecting passage of the article carried by the carrier; and a sorter for sorting the article carried by the carrier, and wherein the measuring unit identifies a carry order of the article by causing the calculator to calculate a change of a sign of the difference in phases between the electric wave radiated from the antenna and the reflected wave from the article when one of the article and the antenna or both of the article and the antenna move in a certain direction, and determines that a lead article has passed so as to perform sorting of the article, when the detector detects the passage of the article.

According to a thirteenth aspect, there is provided the system, wherein the system is configured to sort an article having a non-contact information recording medium that stores information about the article, the system further including: an antenna which mediates transmission/reception of an electric wave; a carrier for carrying the article; a detector for detecting passage of the article carried by the carrier; and a sorter for sorting the article carried by the carrier, and wherein the measuring unit identifies a carry order of the article by causing the calculator to calculate a change of a sign of the difference in phases between the electric wave radiated from the antenna and the reflected wave from the article when one of the article and the antenna or both of the article and the antenna move in a certain direction, and determines that a lead article has passed so as to perform sorting of the article, when the detector detects the passage of the article.

According to a fourteenth aspect, there is provided a method for reading and writing information from and onto a non-contact information recording medium using an electric wave, the method including: radiating the electric wave and receiving a reflected wave modulated by the non-contact information recording medium; transmitting the electric wave to the non-contact information recording medium via the antenna; demodulating the reflected wave modulated by the non-contact information recording medium modulating a part of the electric wave; calculating a difference in phases between the electric wave and the reflected wave from the non-contact information recording medium; and determining that the non-contact information recording medium passes a position most closely to the antenna, on the basis of the calculated difference in phases between the electric wave radiated from the antenna and the reflected wave from the non-contact information recording medium calculated by the calculator.

According to one or more embodiments of the present invention, in a system wherein either or both of an antenna or (and) a non-contact IC tag is (are) moved, it is possible to detect a changing direction of the distance between the non-contact IC tag and the antenna and to detect its changing amount.

In a system wherein either or both of an antenna or (and) a non-contact IC tag is (are) moved, even when a plurality of non-contact IC tags exist in a communicable area, it is possible to identify their arrangement order and movement state, and to correctly set the read IDs in association with the non-contact IC tags.

It is possible to understand the timing at which the non-contact IC tag approaches most closely to the antenna based on the changing direction and changing amount, so as to acquire the position of the non-contact IC tag.

Further, applications for various purposes are possible, by filtering the tag based on information, such as the changing direction of the distance between the antenna and the non-contact IC tag and its changing amount.

BRIEF DESCRIPTION OF THE DRAWINGS

FIGS. 7(a) and (b) show an arrangement order of articles stored in a memory in a PC according to one embodiment of the present invention.

DESCRIPTION OF REFERENCE NUMERALS

1 PLL circuit, 2 VCO, 3 modulator, 4, 8 amplifier, 5 circulator, 6 antenna, 7 tag, 9, 11 mixer, 12, 13 BPF, 14, 16 A/D converter, 15 calculator, 50 reader/writer

DETAILED DESCRIPTION

Embodiments of the present invention will hereinafter specifically be explained with reference to the drawings. Unless specified otherwise, the constituent elements, kinds, combinations, shapes and relative arrangements that are described in the embodiment are simply exemplary only, and they do not limit the scope of the present invention.

Figure 1:
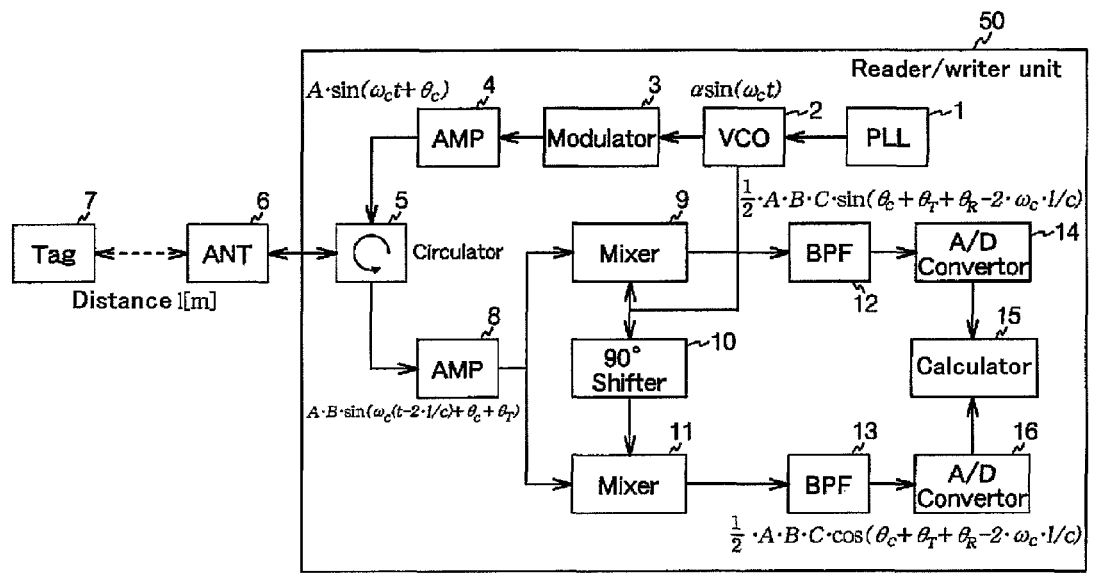
FIG. 1 is a block diagram of a reader/writer according to an embodiment of the present invention.

FIG. 1 is a block diagram of a reader/writer according to an embodiment of the present invention. This reader/writer 50 is configured to include a PLL circuit 1, a VCO 2, a modulator 3, an amplifier 4, a circulator 5, an antenna 6, an amplifier 8, a mixer 9, a mixer 11, a BPF 12, a BPF 13, an A/D converter 14, an A/D converter 16 and a calculator 15. The PLL circuit 1 synchronizes the phase of an output signal of the VCO 2 with the phase of a reference input signal. The VCO 2 oscillates at a predetermined frequency based on a control voltage of the PLL circuit 1. The modulator 3 modulates the signal transmitted from the VCO 2 into a microwave (electric wave). The amplifier 4 amplifies the microwave. The circulator 5 sets its direction in accordance with the direction of the microwave. The antenna 6 transmits the microwave, and receives a reflected wave from a non-contact IC tag (hereinafter simply referred to as a tag) 7. The amplifier 8 amplifies a composite wave that is synthesized by the circulator 5. The mixer 9 adds and superimposes the signal of the VCO 2 and the signal amplified by the amplifier 8, thereby demodulating a sine wave. The mixer 11 adds and superimposes the signal of the VCO 2 (whose phase has been shifted by a 90-degree phase shifter 10) and the signal amplified by the amplifier 8, thereby demodulating a cosine wave. The BPF 12 allows only a predetermined frequency component of the signal of the mixer 9 to pass therethrough. The BPF 13 allows only a predetermined frequency component of the signal of the mixer 11 to pass therethrough. The A/D converter 14 converts an output signal of the BPF 12 into a digital signal. The A/D converter 16 converts an output signal of the BPF 13 into a digital signal. The calculator 15 calculates the phase based on the A/D converter 14 and the A/D converter 16.

In an RFID system using an electric wave, a tag 7 modulates a part of an electric wave (CW wave) given thereto so as to return it (make the wave reflected while changing the amplitude and phase), thereby performing communications from the tag 7 to the reader/writer 50.

To the reader/writer 50, a "reflected wave (a backscattering wave) of its own transmission electric wave" is returned. This backscattering wave goes and comes back between the tag 7 and the antenna 6. Thus, it can be considered that the backscattering wave has a delay in comparison with its transmission electric wave. This delay is in proportion to a double of the distance between the tag 7 and the antenna 6.

In this embodiment, a change in the distance between the antenna 6 and the tag 7 is identified by measuring a difference in the delay times of the backscattering wave.

When a CW wave transmitted from the antenna 6 connected to the reader/writer 50 is expressed as $$A \cdot \sin(\omega_c t + \theta_c) \qquad (1)$$

(where "A" and "$\theta_c$" are constant values set in accordance with a circuit), the backscattering wave from the tag 7 received by the same antenna 6 can be expressed as $$A \cdot B \cdot \sin(\omega_c(t - 2 \cdot l/c) + \theta_c + \theta_T) \qquad (2)$$

where "l[m]" represents the distance between the tag and the antenna, "c" represents the speed of en electric wave [m/s], "B" is a coefficient representing the attenuation in the space or tag, and "$\theta_T$" represents a phase change at the reflection in the tag. In the RFID using an electric wave, when the tag 7 communicates with the reader/writer 50, "B" and "$\theta_T$" change, upon modulation applied by the tag 7.

When the tag communicates with the reader/writer through ASK modulation, if the delay time is measured in synchronization with a symbol representing "1", "$\theta_T$" can be a particular constant value peculiar to the tag.

In the communication through BPSK modulation, if the delay time is measured in synchronization with a symbol representing "1" or "0", "$\theta_T$" can be a particular constant value "$\theta_{T1}$" or "$\theta_{T2}$" ($=\theta_{T1}+\pi$) peculiar to the tag. Similarly, in another phase modulation, if the delay time is measured in synchronization with a certain symbol, "$\theta_T$" can be a particular constant value peculiar to the tag.

Accordingly, when to communicate with the tag 7, the delay time is measured in synchronization with its symbol, the phase at the reflection by the tag 7 is stabilized, and "$\theta_T$" can be considered as a constant value. The measurement is performed for a backscattering wave after modulated, thereby enabling to remove a backscattering wave reflected wave having no change through the BPFs 12 and 13 and also to eliminate an effect (such as reflection) from a surrounding metal substance or a tag being non-communicable.

Further, the delay time is measured when the tag 7 communicates with the reader/writer 50. Thus, under a protocol having an anti-collision function, the delay time can be measured under a condition of limiting to only one target tag for communication. In such an environment where a plurality of tags exist, the delay time can be measured by selecting only the backscattering wave of a particular tag, and data (ID) obtained in this communication can be managed in association with the delay time.

Explanations will now be made to measurement of the delay time in the backscattering wave. The measurement is performed by executing quadrature detection using a local signal $$\alpha \sin(\omega_c t) \qquad (3)$$

which is created from a signal source common to a CW wave.

As a result, IQ signals described below can be obtained.

$$\frac{1}{2} \cdot A \cdot B \cdot C \cdot \cos(\theta_c + \theta_T + \theta_R - 2 \cdot \omega_c \cdot l/c) \qquad (4)$$

$$\frac{1}{2} \cdot A \cdot B \cdot C \cdot \sin(\theta_c + \theta_T + \theta_R - 2 \cdot \omega_c \cdot l/c) \quad (5)$$

"C" and "$\theta_R$" are variables that are added upon operation of quadrature detection. Because "C" is a value that is set in accordance with a circuit, "C" can be considered as a constant value. The local signal and the CW wave are signals from the same signal source. The phase difference can be considered as a constant value in accordance with the circuit. Thus, "$\theta_R$" can be considered also as a constant value that is set in accordance with the circuit.

The signals are read by the A/D converters 14 and 16. Then, the calculator 15 obtains a phase "$\theta_r$."

$$\theta_r = \theta_c + \theta_T + \theta_R - 2 \cdot \omega_c \cdot 1 l c = \arctan\left(\frac{I}{Q}\right) \quad (6)$$

$\theta_c \bullet \theta_T \bullet \theta_R$ can all be considered as a constant value. Thus, if "l" is a function of "t", "$\theta_r$" can be expressed as follows:

$$\theta_r = \theta(t) = \theta_{const} - \frac{4\pi}{\lambda_c} \cdot 1(t) = \theta_{const} - \frac{2 \cdot \omega_c}{c} \cdot 1(t) \quad (7)$$

While a distance change Δl does not exceed $\lambda_c/4$, $\theta_r$ is obtained again, thereby obtaining a difference in the delay time from $\theta_r$.

As long as $$\frac{d\theta}{dt} < 0, \quad (8)$$

it can be said that a tag having an ID obtained through this communication is being moved in a direction away from the antenna.

If $$\frac{d\theta}{dt} > 0, \quad (9)$$

it can be said that a tag having an ID obtained through this communication is being moved in a direction approaching the antenna.

In the system where either or both of the tag 7 or (and) the antenna 6 is (are) moved, and its movement direction or speed is constant, distance "l(t)" is expressed by a quadratic function. When both of the tag 7 and the antenna 6 are in points at the minimum distance therebetween (when the tag and the antenna are not in the same movement direction and with the same speed), dl/dt=0. Thus, when dl/dt=0 (i.e. dθ/dt=0), the tag and the antenna are positioned at the shortest distance.

If dθ/dt is obtained, it is possible to detect the timing at which the tag 7 and the antenna 6 are in the closest positions. Further, if tags are in the same movement direction with the same speed, and also are moved along the same line, it is possible to set the order of the tags, based on a comparison result of dθ/dt.

Figures 7, 8:
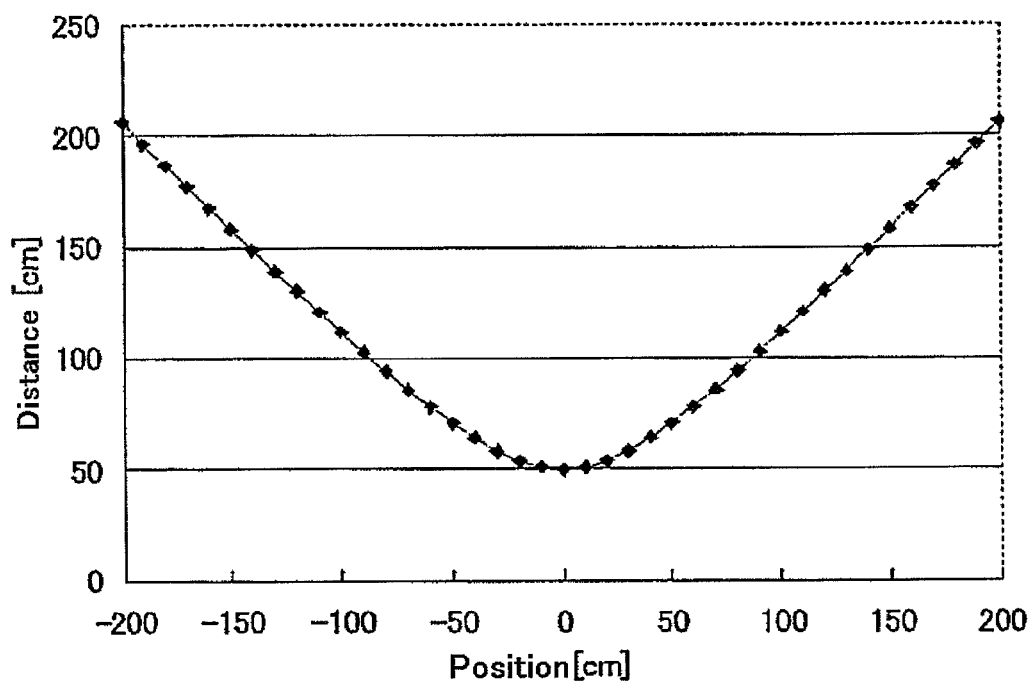
FIG. 8 is a diagram showing the relationship between the distances and positions of the tag 7 and the antenna 6 according to one embodiment of the present invention.
Figure 9:
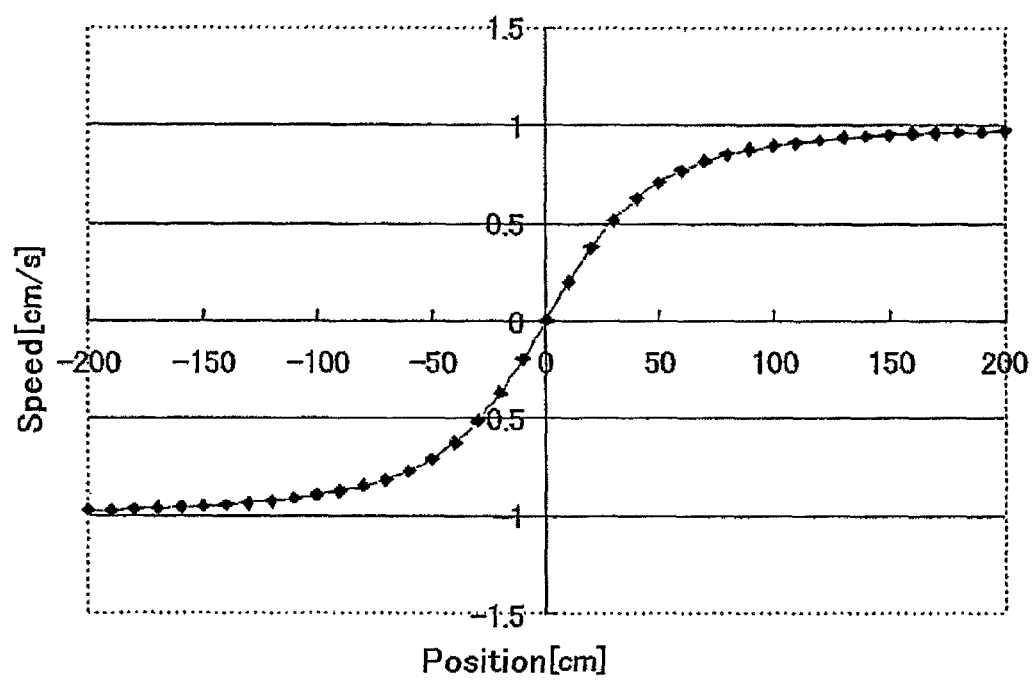
FIG. 9 is a diagram showing the relative speed of the tag 7 and the antenna 6 according to one embodiment of the present invention.

FIG. 8 is a diagram showing the relationship between the distance and positions of the tag 7 and the antenna 6. FIG. 9 is a diagram showing the relative speed of the tag 7 and the antenna 6. FIG. 8 and FIG. 9 show a case wherein the movement speed of the tag 7 is 1 (cm/s), and the distance in front of the antenna 6 is 50 (cm).

In passage detection based on the fact that the relative speed is reversed in front of the antenna 6, when the tag 7 may possibly stop in a detection area, it is necessary to make sure that the relative speed opposite to the speed at the entry is attained, in order to securely detect the passage. At the detection, the tag 7 is already being away from the antenna 6. Thus, a problem exists on an operation of the tag whose passage has been detected.

According to the present invention, in "passage detection of tag", a passage detection unit is provided with information representing the movement of the tag or information representing the movement of a carrier having a tag attached thereonto. Under conditions of "tag is moved" and "relative speed with antenna is 0", the passage is detected.

In this case, "a" represents the speed [m/s] of the tag, "l" represents the distance [m] in the front of the antenna, and "Ta" represents the timing [s] to pass in front of the antenna.

In a system where the movement direction and speed of the tag 7 are not constant, it is possible to attain that dl/dt=0, not only when the both articles are in points at the minimum distance therebetween, but also when the tag stops being moved.

In this system, the detection unit is provided with information regarding the movement of the tag, and a determination includes another condition that the tag does not stop being moved (absolute speed>0). As a result, the point where dl/dt=0 (i.e. dθ/dt=0) is the position where the tag and the antenna are at the shortest distance. Similarly, the determination includes another condition that the antenna does not stop to be moved (absolute speed>0), when the antenna 6 is moved, and when its movement direction and the speed are not constant.

The information of the movement regarding the tag and provided to the detection unit includes control information regarding some unit, when the unit is used as a carrier unit, such as a conveyer belt. The information includes information for monitoring the movement, speed, position and distance to an article having a tag attached thereto, using an external sensor. The information includes information regarding the synchronized movement of articles on a carrier line and detected by an infrared sensor. The reader includes a function for detecting the movement of the tag, and the reader itself determines and detects the movement of the tag.

That is, the reader/writer 50 communicates with the tag 7 using a microwave in a microwave system. Thus, an electric wave (microwave) sent from the reader/writer 50 is modulated by the tag 7, and then received by the reader/writer 50 as a reflected wave. A delay time occurs between the sent electric wave and the reflected wave, in accordance with the distance therebetween. In this embodiment, this delay time is calculated and obtained, thereby obtaining the change in the distance between the tag 7 and the antenna 6. As a result, it is possible to identify the arrangement order and movement state of a plurality of tags in a readable area in a movable system, by acquiring the change in the distance between the tags 7 to be moved.

In quadrature modulation, a sine wave and a cosine wave are phase-shifted (quadrature) so as to be added and superimposed. As a result, the amplitude of the composite wave reaches the maximum amplitude of the cosine wave, when the amplitude of the sine wave is at zero phase. In addition, it attains the maximum amplitude of the sine wave, when the amplitude of the cosine wave is at zero phase, thereby generating a composite amplitude. That is, two signals can be modulated so as to be one single composite wave. In this embodiment, by quadrature modulation of the composite wave modulated based on this principle, the sine wave (sent electric wave) and the cosine wave (reflected wave) are demodulated.

Figure 2:
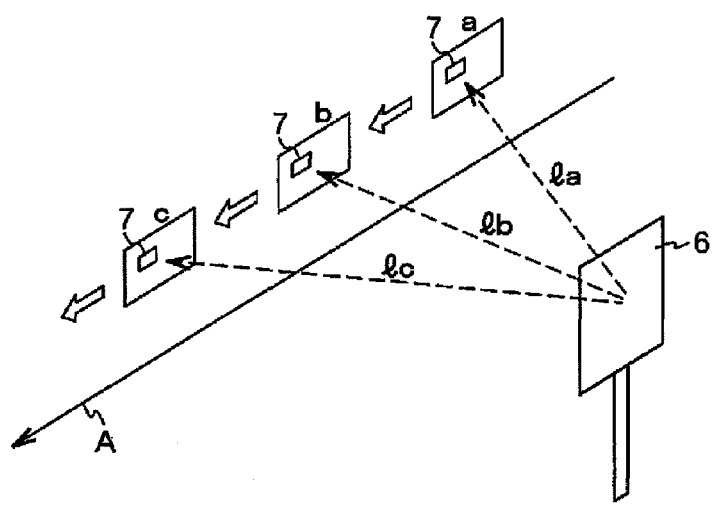
FIG. 2 is a schematic diagram according to one embodiment of the present invention showing the relationship between an antenna and the distances to tags, when the tags are moved.

FIG. 2 is a schematic diagram showing the relationship between the antenna and the tag, when the tag is moved. In this figure, it is assumed that an article "a", an article "b" and an article "c", which include the tag 7 provided thereon, are moved at a predetermined interval in a direction of arrow A.

In FIG. 2, the distance between the antenna 6 and the article "a" is "la", the distance between the antenna 6 and the article "b" is "lb", and the distance between the antenna 6 and the article "c" is "lc".

For example, when the antenna 6 is fixed, and the tag 7 is moved at a constant speed, the relationship between the distance and the time is a quadratic function. That is, when focusing on one tag being moved, it approaches the antenna 6 from a predetermined direction (upstream side of arrow A), and gets away from the nearest position from the antenna 6. That is, it is possible to identify the movement direction and speed of the tag based on its direction and size of the vector. Therefore, it is possible to identify the arrangement order of the articles "a", "b" and "c", and the movement direction from the antenna 6.

Figure 3:
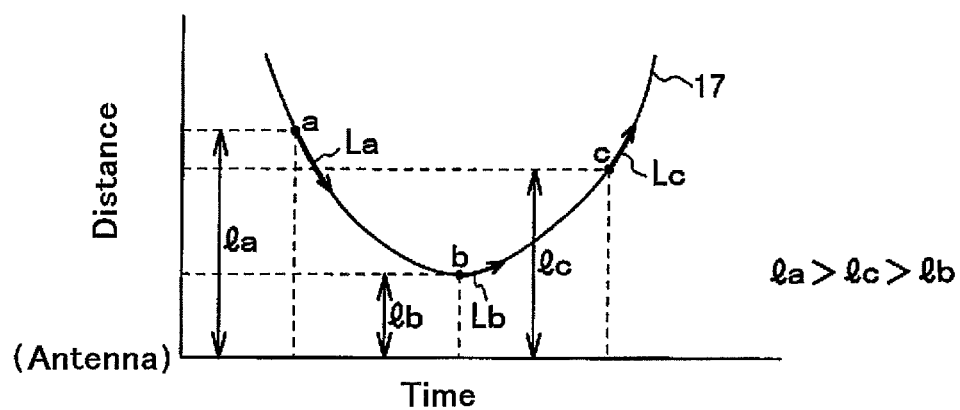
FIG. 3 is a diagram for further specifically explaining an operation of FIG. 2.

FIG. 3 is a diagram for further specifically explaining the operation of FIG. 2. The vertical axis shows the distance from the antenna 6 (origin) to the articles "a", "b" and "c", while the horizontal axis shows the passage time. As obvious from this figure, as to the article "a", when the distance to the antenna 6 is "la", the direction and size of the vector is arrow "La", and the distance to the antenna 6 decreases (approaches) in accordance with a quadratic function 17. As to the article "b", when the distance to the antenna 6 is "lb", the direction and size of the vector is arrow "Lb", and the distance to the antenna 6 is the minimum point (gets closest) of the quadratic function 17. As to the article "c", when the distance to the antenna 6 is "lc", the direction and size of the vector is arrow "Lc", and the distance to the antenna 6 increases (gets away) in accordance with the quadratic function 17.

For thus movable articles, the equations (1) to (7) are calculated, and thereby it is possible to detect the changing direction of the distance between the tag 7 and the antenna 6 and to detect its changing amount, in the system wherein either or both of the antenna 6 or (and) the tag 7 is (are) moved.

As a result, in the system wherein either or both of the antenna 6 or (and) the tag 7 is (are) moved, even when a plurality of tags exist in a communicable area, it is possible to identify their order and movement state, and is also possible to correctly set read IDs in association with the tags. It is also possible to know the timing at which the tag 7 and the antenna 6 are in their closest positions so as to acquire the position of the tag, based on the changing direction and changing amount. In addition, it is considered that applications for various purposes are possible, by filtering the tag based on information, such as the changing direction of the distance between the antenna and the tag, the changing amount of the distance between the antenna and the tag, etc.

Figure 4:
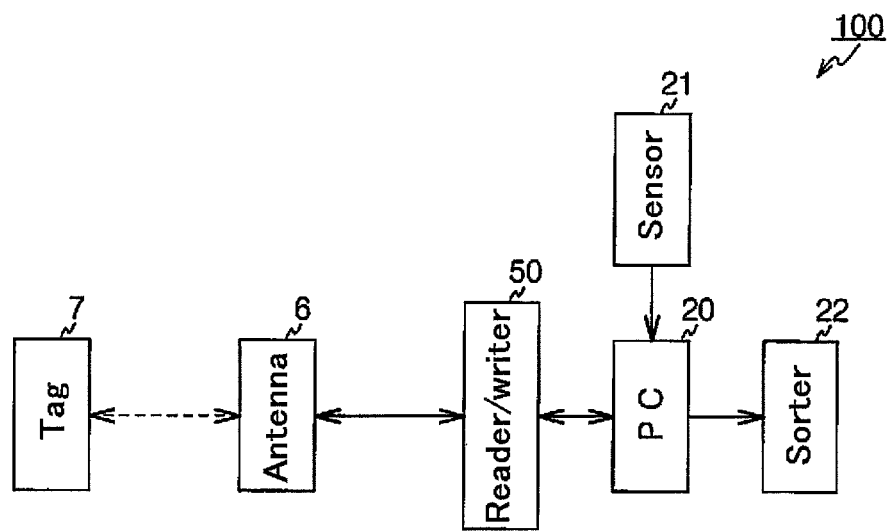
FIG. 4 is a block diagram showing a configuration of an article sorting system according to one embodiment of the present invention.

FIG. 4 is a block diagram showing a configuration of an article sorting system of the present invention. The same constituent elements are explained with the same reference numerals as those of FIG. 1. This article sorting system 100 includes the reader/writer 50 shown in FIG. 1, the antenna 6 mediating transmission/reception of en electric wave, a sensor (detection means) 21, a sorter (sorting means) 22 and a PC (control means) 20. The sensor 21 detects passage of articles carried by a non-illustrative carrier means. The sorter 22 sorts the articles carried by the carrier means. The PC 20 obtains the change in the distance between the antenna 6 and the article by measuring the difference in the delay times calculated by the calculation means so as to identify the arrangement order of the articles and the movement direction from the antenna 6. When the sensor 21 detects passage of the article, it determines that the lead article of the arrangement order has passed so as to sort the articles.

This embodiment is an invention for a sorting system which identifies and automatically sorts articles being moved. That is, this embodiment includes the reader/writer 50 of FIG. 1, arranges the antenna 6, for example, near the belt conveyer, gives and receives information to and from the tag 7 attached onto the articles, and identifies the arrangement order of the articles and the movement direction from the antenna 6 based on the information. To sort the articles, the system includes the sensor 21 for detecting the passage of the articles and the sorter 22 for actually sorting the articles. The PC 20 stores the arrangement order and the movement direction. When the sensor 21 detects the passage of the articles, the PC 20 determines that the lead article in the arrangement order has passed, and sorts the articles. As a result, even if the articles in the readable area are moved, the system can correctly acquire the arrangement order and correctly sort the articles.

Figure 5:
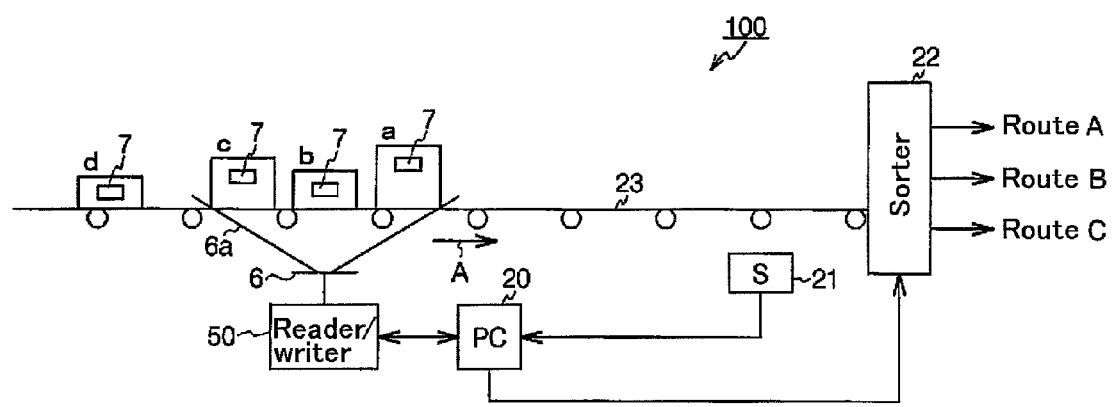
FIG. 5 is a schematic diagram for explaining an example of an operation of the sorting system of the present invention.

FIG. 5 is a schematic diagram for explaining an example of an operation of the sorting system of the present invention. The same constituent elements are explained with the same reference numerals as those shown in FIG. 1 and FIG. 4. In this embodiment, for the sake of simple explanations, the articles "a" to "d" are put on a belt conveyer 23, and the tag 7 is attached onto each of the articles. This tag 7 stores information regarding its corresponding article (tag ID, route information, etc.). The articles "a", "b", "c" and "d" are sequentially arranged in their arrangement order. The belt conveyer 23 moves in the direction of arrow A. The antenna 6 has a readable area 6a.

Figure 6:
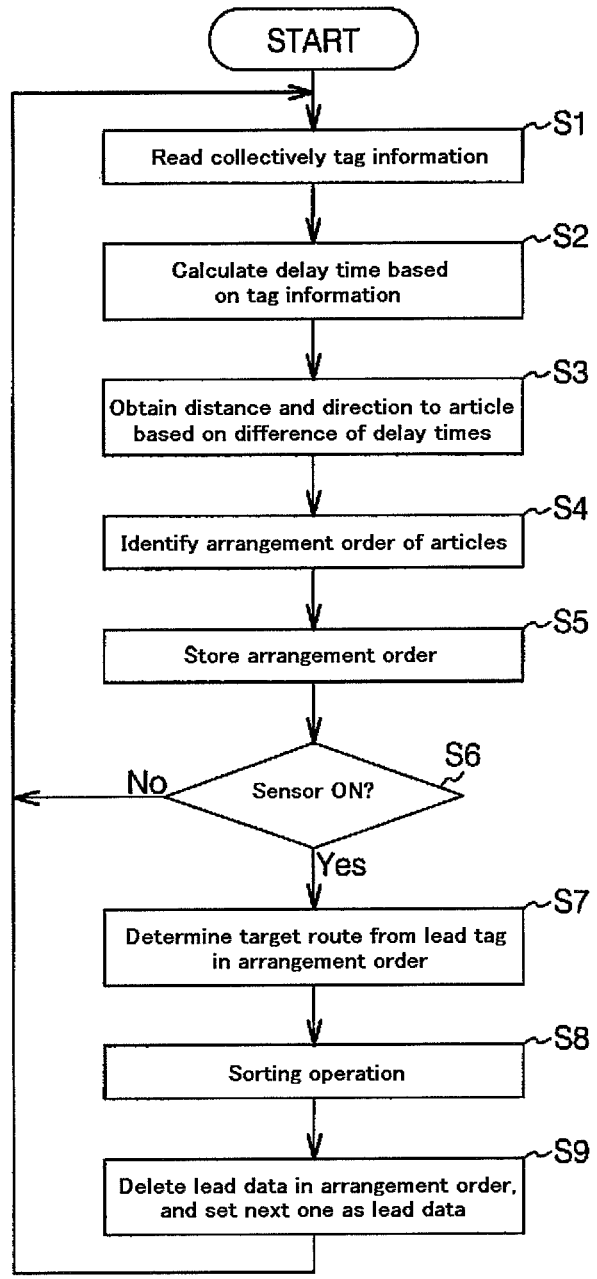
FIG. 6 is a flowchart for explaining an operation of the sorting system of FIG. 5.

FIG. 6 is a flowchart for explaining an operation of the sorting system of FIG. 5. Explanations will now be made with reference to FIG. 5. The reader/writer 50 collectively reads information of the tag 7 regarding the articles "a", "b" and "c" in the readable area 6a (S1). The PC 20 calculates the delay time of each tag based on the read information by the reader/writer 50 (S2). The PC 20 obtains the distance and direction to each of the articles "a", "b" and "c", based on the difference in the delay times (S3). In this figure, it can be identified that the article "a" is moved into a direction away from the antenna 6, the article "b" approaches most closely to the antenna 6, and the article "c" is approaching the antenna 6. It can be identified that the articles "a", "b" and "c" are arranged sequentially in the arrangement order based on the calculation results (S4). This information is stored in the memory of the PC 20 (S5) (see FIG. 7). The system checks whether the sensor 21 has detected the article (S6). Since it is not known when this checking is performed, the checking is preferably performed as an interrupt process. When the sensor 21 is OFF in step S6 (No in S6), the flow returns to step S1, and will be repeated. When the sensor 21 is ON in step S6 (Yes in S6), the system determines the target route, based on the lead article "a" stored in the memory (S7). In this example, because the target route of the article "a" is "B", the sorter 22 performs a sorting operation to lead the article "a" for the route "B" (S8) (see FIG. 7(a)). The data regarding the already-sorted article "a" is not necessary so as to be deleted. The next article "b" is set as the lead article as FIG. 7(b), and the flow returns to step S1 so as to be repeated (S9).

FIG. 7 is a diagram showing the arrangement order of the articles stored in the memory of the PC. This memory stores the contents of the case shown in FIG. 5, for example. In FIG. 7(a), the memory stores the article "a" in "article" 24 and the target route "B" in "target route" 25, in the head address (AA). In the address (BB), "article" 24 stores the article "b", while "target route" 25 stores the route "A". In the address (CC), "article" 24 stores the article "c", and while "target route" 25 stores the route "C". Upon complete sorting of the article "a", the article "a" stored in the address (AA) is deleted, as shown in FIG. 7(b), and the article "b" stored in the address (BB) is moved up to the address (AA), and the successive articles are sequentially moved up so as to be stored. As a result, the article "b" will be the lead article.

As seen from FIG. 9, the relative speed is close to the actual speed in a position far from the antenna, and decreases as approaching the antenna. In front of the antenna, the relative speed will be 0, while the positive and negative of the movement direction are reversed. With the features of this relative speed, the passage of the tag can be detected.

In one or more embodiments of the present invention, information regarding the movement of the tag is given to the detection unit. With determination conditions that the relative speed of the tag and the antenna is equal to "0" and that the tag does not stop to be moved (absolute speed>0), it is possible to definitely and quickly detect that the tag is passing in front of the antenna.

When the relative speed is positive at the time the tag is approaching the antenna, it is determined that the relative speed of the antenna and the tag is equal to "0". When it can be determined that the relative speed of the antenna and the tag turns to negative, and that the relative speed has passed the point of "0", and also when the tag is being moved (absolute speed>0), it is determined that the tag has come in front of the antenna.

According to one or more embodiments of the present invention, it is possible to detect that the tag has come in front of the antenna without any delay. As a result, it is easy to continuously perform operations on the tag at the antenna which has performed the detection. It is possible to improve the real-time processing of the system that determines further operations afterwards, based on information regarding the tag.

In one specific example, the system detects that persons having a tag have come, and writes information representing the order of the persons and representing the time the persons approach, in the tag. The system performs an operation for detecting that persons having a tag have come, and for opening/closing the gate based on the information about the tag. The system detects that the persons having a tag have come, and displays or issues an instruction based on the information about the tag on that occasion. The system detects that the baggages with a tag have come, and displays the information on that occasion, thereby letting them check visually at the same time.

Figure 10:
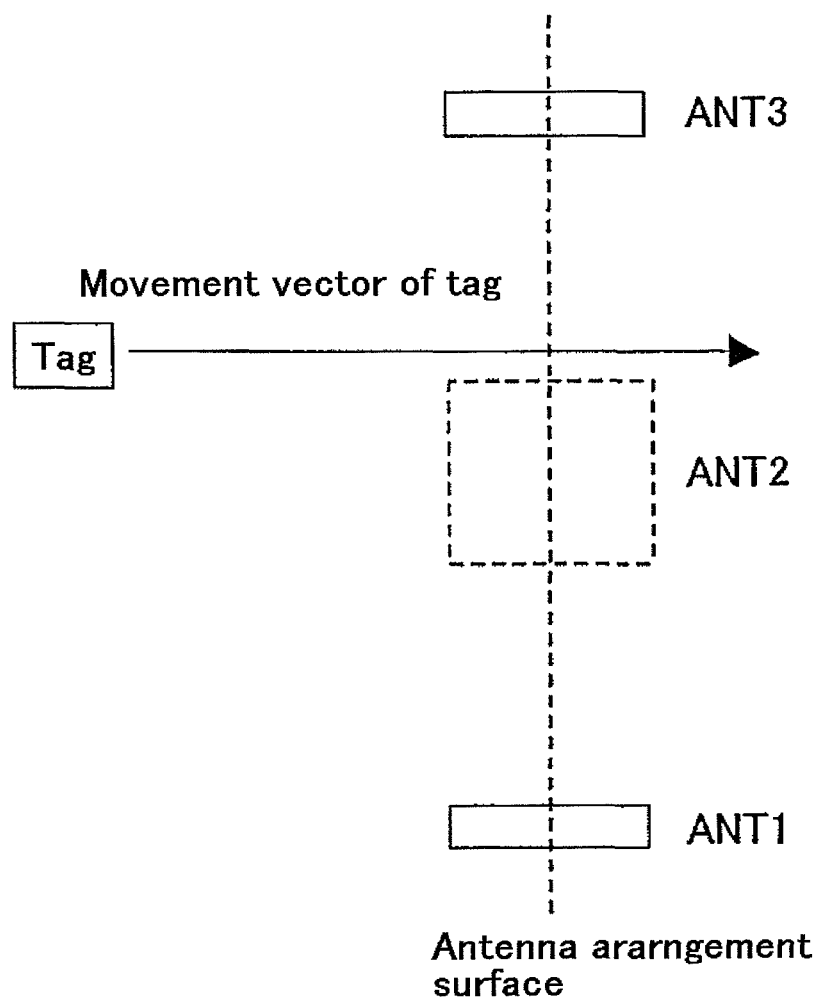
FIG. 10 is a schematic diagram showing the movement vector of the tag and the positional relationship with each of the antennas according to one embodiment of the present invention.

FIG. 10 is a schematic diagram showing the movement vector of the tag and the positional relationship between each of the antennas. To read the tag whose direction and position are not constant, it is necessary to prepare in advance a plurality of antennas (ANT 1 to 3) with different angles with respect to the tag, and to read the tag while switching them from one to another. This is because it cannot be acknowledged in advance in which direction the tag has the null point of the directivity, and communications in which direction can be succeeded. In this case, to know the time the tag has passed in front of the antenna, it is necessary that a plurality of antennas detect the passage at the same time. However, if communications are performed while switching the plurality of antennas from one to another in time sharing, a communication opportunity per antenna decreases. This results in a problem of decreasing the accuracy of measuring the passage time. When the antennas have different tendencies, it is necessary to determine which antenna is reliable.

By performing the reading while switching the plurality of antennas in a very short period of time, the reading can be performed from different angles with using on single reader. Thus, the reading can securely be expected, even for a tag whose null point of directivity is not acknowledged. However, the following problem occurs, if obtaining the passage of the tag based on some tendency, such as a receiving intensity level, the number of times the reception is succeeded. That is, the antennas may have different tendencies individually. If an n-number of antennas are installed, the communication opportunity is 1/n or less. The former problem is difficult to be prevented, because the antenna of the tag has directivity. The antennas are detected individually. Thus, there is an unsolvable problem that information of which antenna is reliable. In addition, the accuracy decreases under the influence of the latter problem.

For example, if an n-number of antennas are switched from one to another at each antenna switching time unit m[ms], a "no-data" period of m×(n−1) [ms] exists for each antenna. Thus, the time detection accuracy is deteriorated as compared to the case of one single antenna.

According to one or more embodiments of the present invention, the same accuracy as the case of one single antenna is realized for passage detection, by enabling to evaluate information from the entire antennas based on the same standard. As shown in FIG. 10, the entire antennas are arranged on one plane. This antenna arrangement plane should be in perpendicular relation to the movement vector of the tag.

For example, when the movement vector of the tag is shown as ($\alpha$, 0, 0), each antenna is arranged on a yz plane. At this time, it can be said that the shortest distance points to the entire antennas are on the yz plane (antenna arrangement plane), regardless of the position of the tag. That is, the shortest distance points to the tag are same between the entire antennas. Because different distances are made between the antennas and the tag, the relative speeds v(t) are not the same, "t" is the same, and "v(t)" has the same sign so as to attain v(t)=0.

The relative speed of the tag and the antennas is acquired, and the passage is identified based on the sign of v(t) or the point that v(t) is equal to "0". As a result, the passage can be identified without considering which antenna has acquired the value. At this time, if the relative speed is always successfully measured, the measurement can be performed at the same time interval as the measurement using one single antenna, and the same accuracy can be attained as that case, regardless of the number of antenna (s), and regardless of the time interval at which the antennas are switched.

Even if the measurement of the relative speed with the tag cannot certainly be succeeded by one antenna included in the n-number of antennas, a "blank-period" due to its effect can be restricted within the antenna switching time unit m[ms], thus having relatively a very little effect on the accuracy.

When the entire antennas cannot be arranged on the same plane, the antennas are arranged on an arbitrary plane parallel to that plane. Then, "t" is compensated for based on the movement speed of the tag and the distance between the planes, thereafter performing the comparison. As a result, the accuracy of passage detection can be improved, when reading the tag in different directions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A system which reads and writes information from and onto a non-contact information recording medium using an electric wave, the system comprising:
    a reader/writer comprising:
        an antenna configured to radiate the electric wave and receive a reflected wave modulated by said non-contact information recording medium;
        a transmitter configured to transmit the electric wave to the non-contact information recording medium via the antenna;
        a demodulator configured to demodulate the reflected wave obtained by said non-contact information recording medium modulating a part of the electric wave;
        a calculator configured to calculate a difference in phases between the electric wave and the reflected wave from the non-contact information recording medium; and
        a measuring unit configured to determine that the non-contact information recording medium passes a position closest to the antenna, on the basis of the difference in phases between the electric wave radiated from the antenna and the reflected wave from the non-contact information recording medium calculated by the calculator.

2. The system according to claim 1, wherein the measuring unit determines, on the basis of a comparison result of the difference in phases, an arrangement order of non-contact information recording medium media moving in a same movement direction and with a same speed and moving along a same line.

3. The system according to claim 2, wherein the measuring unit determines that the non-contact information recording medium has passed in front of said antenna, at an instance at which a change occurs in the sign of the difference in phases between the electric wave radiated from the antenna and the reflected wave from the non-contact information recording medium calculated by the calculator when one of the non-contact information recording medium and the antenna or both of the non-contact information recording medium and the antenna move in a certain direction.

4. The system according to claim 2, wherein the reader/writer further comprises:
    a plurality of antennas that are arranged in a plane perpendicular to a movement vector of said non-contact information recording medium,
    wherein the measuring unit determines that the non-contact information recording medium has passed the position closest to the antenna by causing the calculator to calculate a change of the sign of the difference in phases between the electric wave radiated from the antenna and the reflected wave from the non-contact information recording medium.

5. The system according to claim 2, wherein the system is configured to sort an article having a non-contact information recording medium that stores information about the article, the system further comprising:
    an antenna which mediates transmission/reception of an electric wave;
    a carrier for carrying the article;
    a detector for detecting passage of the article carried by the carrier; and
    a sorter for sorting the article carried by said carrier,
    wherein the measuring unit identifies a carry order of the article by causing the calculator to calculate a change of a sign of the difference in phases between the electric wave radiated from the antenna and the reflected wave from the article when one of the article and the antenna or both of the article and the antenna move in a certain direction, and determines that a lead article has passed so as to perform sorting of the article, when the detector detects the passage of the article.

6. The system according to claim 1, wherein the measuring unit causes the calculator to calculate a change of a sign of the difference in phases between the electric wave radiated from the antenna and the reflected wave from the non-contact information recording medium when one of the non-contact information recording medium and the antenna or both of the non-contact information recording medium and the antenna move in a certain direction, thereby identifying a timing at which said non-contact information recording medium has approached most closely to the antenna.

7. The system according to claim 6, wherein the measuring unit determines that the non-contact information recording medium has passed in front of said antenna, at an instance at which a change occurs in the sign of the difference in phases between the electric wave radiated from the antenna and the reflected wave from the non-contact information recording medium calculated by the calculator when one of the non-contact information recording medium and the antenna or both of the non-contact information recording medium and the antenna move in a certain direction.

8. The system according to claim 6, wherein the reader/writer further comprises:
    a plurality of antennas that are arranged in a plane perpendicular to a movement vector of said non-contact information recording medium,
    wherein the measuring unit determines that the non-contact information recording medium has passed the position closest to the antenna by causing the calculator to calculate a change of the sign of the difference in phases between the electric wave radiated from the antenna and the reflected wave from the non-contact information recording medium.

9. The system according to claim 6, wherein the system is configured to sort an article having a non-contact information recording medium that stores information about the article, the system further comprising:
    an antenna which mediates transmission/reception of an electric wave;
    a carrier for carrying the article;
    a detector for detecting passage of the article carried by the carrier; and a sorter for sorting the article carried by said carrier,
wherein the measuring unit identifies a carry order of the article by causing the calculator to calculate a change of a sign of the difference in phases between the electric wave radiated from the antenna and the reflected wave from the article when one of the article and the antenna or both of the article and the antenna move in a certain direction, and determines that a lead article has passed so as to perform sorting of the article, when the detector detects the passage of the article.

10. The system according to claim 1, wherein the measuring unit determines that the non-contact information recording medium has passed in front of said antenna, at an instance at which a change occurs in the sign of the difference in phases between the electric wave radiated from the antenna and the reflected wave from the non-contact information recording medium calculated by the calculator when one of the non-contact information recording medium and the antenna or both of the non-contact information recording medium and the antenna move in a certain direction.

11. The system according to claim 10, wherein the system is configured to sort an article having a non-contact information recording medium that stores information about the article, the system further comprising:
an antenna which mediates transmission/reception of an electric wave;
a carrier for carrying the article;
a detector for detecting passage of the article carried by the carrier; and
a sorter for sorting the article carried by said carrier, wherein the measuring unit identifies a carry order of the article by causing the calculator to calculate a change of a sign of the difference in phases between the electric wave radiated from the antenna and the reflected wave from the article when one of the article and the antenna or both of the article and the antenna move in a certain direction, and determines that a lead article has passed so as to perform sorting of the article, when the detector detects the passage of the article.

12. The system according to claim 1, wherein the reader/writer further comprises:
a plurality of antennas that are arranged in a plane perpendicular to a movement vector of said non-contact information recording medium,
wherein the measuring unit determines that the non-contact information recording medium has passed the position closest to the antenna by causing the calculator to calculate a change of the sign of the difference in phases between the electric wave radiated from the antenna and the reflected wave from the non-contact information recording medium.

13. The system according to claim 1, wherein the system is configured to sort an article having a non-contact information recording medium that stores information about the article, the system further comprising:
an antenna which mediates transmission/reception of an electric wave;
a carrier for carrying the article;
a detector for detecting passage of the article carried by the carrier; and
a sorter for sorting the article carried by said carrier, wherein the measuring unit identifies a carry order of the article by causing the calculator to calculate a change of a sign of the difference in phases between the electric wave radiated from the antenna and the reflected wave from the article when one of the article and the antenna or both of the article and the antenna move in a certain direction, and determines that a lead article has passed so as to perform sorting of the article, when the detector detects the passage of the article.

14. A method for reading and writing information from and onto a non-contact information recording medium using an electric wave, the method comprising:
radiating the electric wave and receiving a reflected wave modulated by said non-contact information recording medium;
transmitting the electric wave to the non-contact information recording medium via the antenna;
demodulating the reflected wave modulated by said non-contact information recording medium modulating a part of the electric wave;
calculating a difference in phases between the electric wave and the reflected wave from the non-contact information recording medium; and
determining that the non-contact information recording medium passes a position closest to the antenna, on the basis of the calculated difference in phases between the electric wave radiated from the antenna and the reflected wave from the non-contact information recording medium.

* * * * *